United States Patent [19]

Hatle

[11] Patent Number: 5,081,577
[45] Date of Patent: Jan. 14, 1992

[54] STATE CONTROLLED DEVICE DRIVER FOR A REAL TIME COMPUTER CONTROL SYSTEM

[75] Inventor: Richard Hatle, Massapequa, N.Y.
[73] Assignee: Harris Corporation, Melbourne, Fla.
[21] Appl. No.: 455,760
[22] Filed: Dec. 22, 1989
[51] Int. Cl.$^5$ .......................... G06F 9/00; G06F 13/00
[52] U.S. Cl. ..................................... 364/200; 364/242
[58] Field of Search ................ 364/200, 900; 371/16.3

[56] References Cited

U.S. PATENT DOCUMENTS

| | | | |
|---|---|---|---|
| 3,749,897 | 7/1973 | Hirvela | 235/153 |
| 4,257,095 | 3/1981 | Nadir | 364/360 |
| 4,502,038 | 2/1985 | Lowenthal et al. | 340/365 |
| 4,649,479 | 3/1987 | Advani et al. | 364/300 |
| 4,701,848 | 10/1987 | Clyde | 364/300 |

*Primary Examiner*—Dale M. Shaw
*Assistant Examiner*—Andrew Bodendorf
*Attorney, Agent, or Firm*—Scully, Scott, Murphy & Presser

[57] ABSTRACT

An improved device driver for a real time computer system operated by a nonmultitasking operation system and controlling the operation of polled peripheral devices which do not have an interrupt generation capability. The improved device driver of the present invention operates on the general principle of releasing control back to the operating system before completion of a task when a peripheral device is not in a state of readiness to perform its task. The technical approach is a single entry software routine utilizing a state variable to keep track of the internal state of execution of the device driver, which relinquishes control back to the operating system while waiting for the device to become ready to respond, thus allowing the CPU to execute other tasks. Before releasing control to the operating system, the state controlled device driver sets up a system timer interrupt, or sets a system request bit, with a locally optimized time interval which will bring control back to the device driver to assure subsequent continuation and completion of the task.

4 Claims, 3 Drawing Sheets

STATE CONTROLLED DEVICE DRIVER FOR A REAL TIME COMPUTER CONTROL SYSTEM

BACKGROUND OF THE INVENTION

1. Field of the Invention

The present invention relates generally to a state controlled device driver for improving the performance of a real time computer system operated by a nonmultitasking operating system and controlling the operation of polled peripheral devices which do not have an interrupt generation capability.

More particularly, the subject invention concerns a software approach for a device driver for improving the performance of a computer system which controls in real time the operation of polled peripheral devices such as printers, disc drives, tape drives, bus controllers, polling loops, etc. which do not have an interrupt capability. Pursuant to the present invention, the device driver releases control back to the operating system before completion of the task of a peripheral device when the device is not immediately ready and able to complete that task.

2. Discussion of the Prior Art

In a typical prior art device driver operated by a nonmultitasking operating system, the operating system relinquishes control to a device driver, after which a pre-transmit setup is executed and the readiness of the peripheral device to perform its task is checked. The driver then waits until the device is ready to perform its task, and a transmission of data then normally takes place. This is repeated until the task is completed, at which a 'done' condition is satisfied, after which a post-transmit setup is executed, and control is returned back to the operating system. In such a typical prior art device driver, control is relinquished to the device driver, and if the device is not ready or able to perform its task, then the operating system must stand idly by and wait until the device becomes ready and as the device driver completes its task. Control is then relinquished back to the operating system, at which time the operating system can assume other assigned tasks such as controlling the operation of other peripheral devices. This type of prior art computer system is particularly disadvantageous with slow peripheral devices, such as tape drives, printers, disk drives, communication busses, and instrument drivers in industrial control systems.

SUMMARY OF THE INVENTION

Accordingly, it is a primary object of the present invention to provide an improved device driver which results in an improvement in the performance of a real time computer system operated by a nonmultitasking operating system and controlling the operation of polled peripheral devices which do not have an interrupt generation capability. The present invention operates without changes to the operating system, or a requirement for an external device emulator with buffer RAM storage, which could be used to download into to store all data required to drive the device such as a printer, etc., to allow better utilization of the time of the CPU.

The present invention provides a software approach for an improved device driver which operates on the general principle of releasing control back to the operating system before completion of a task when a peripheral device is not in a state of readiness to perform its task.

In accordance with the teachings herein, the present invention provides an improved multistate controlled device driver wherein the readiness of the device to perform its task determines whether the device driver causes the device to perform its task, or releases control back to the operating system after setting a request interrupt timer or system request bit. This technical approach essentially prevents wasted waiting time by the CPU while waiting for the peripheral device to become ready to perform its task. The technical approach is applicable to peripheral devices without an interrupt generation capability such as printers, disc drives, tape drives,. bus controllers, polling loops, etc.

The state controlled device driver of the present invention allows concurrent task operation in a nonmultitasking operating system where the peripheral device itself has no interrupt generating capability. The technical approach is a single entry routine utilizing a state variable to keep track of the internal state of execution of the device driver, which relinquishes control back to the operating system while waiting for the device to become ready to respond, thus allowing the CPU to execute other tasks. The state controlled device driver sets up a system timer interrupt, or sets a system request bit, with a locally optimized time interval which will bring control back to the device driver via an interrupt vector to assure subsequent continuation and completion of the task. This is accomplished in a manner completely transparent to the operating system, which would normally have to wait until execution by the peripheral device is fully completed before assuming other tasks.

The state controlled device driver can directly replace an existing device driver, and improve system performance without an impact on the operating system. Interrupt priorities or resource allocation are not impacted or altered by the state controlled device driver at the operating system level. It supports a modular design concept, and localizes all decisions and uniqueness in one state controlled device driver, simplifying system design and enhancing error isolation.

BRIEF DESCRIPTION OF THE DRAWINGS

The foregoing objects and advantages of the present invention for a state controlled device driver may be more readily understood by one skilled in the art with reference being had to the following detailed description of a preferred embodiment thereof, taken in conjunction with the accompanying drawings in which.

DETAILED DESCRIPTION OF THE DRAWINGS

Figure 1:
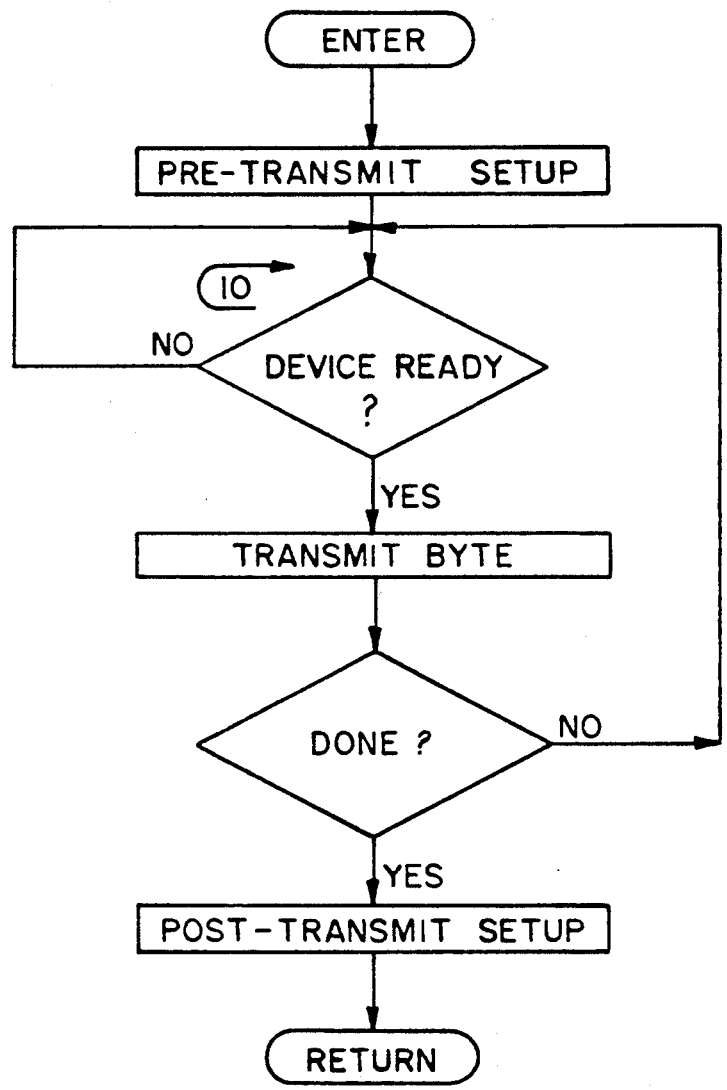
FIG. 1 illustrates a logic flow diagram of the operation of a typical prior art device driver for a peripheral device without an interrupt generation capability.
Figure 2:
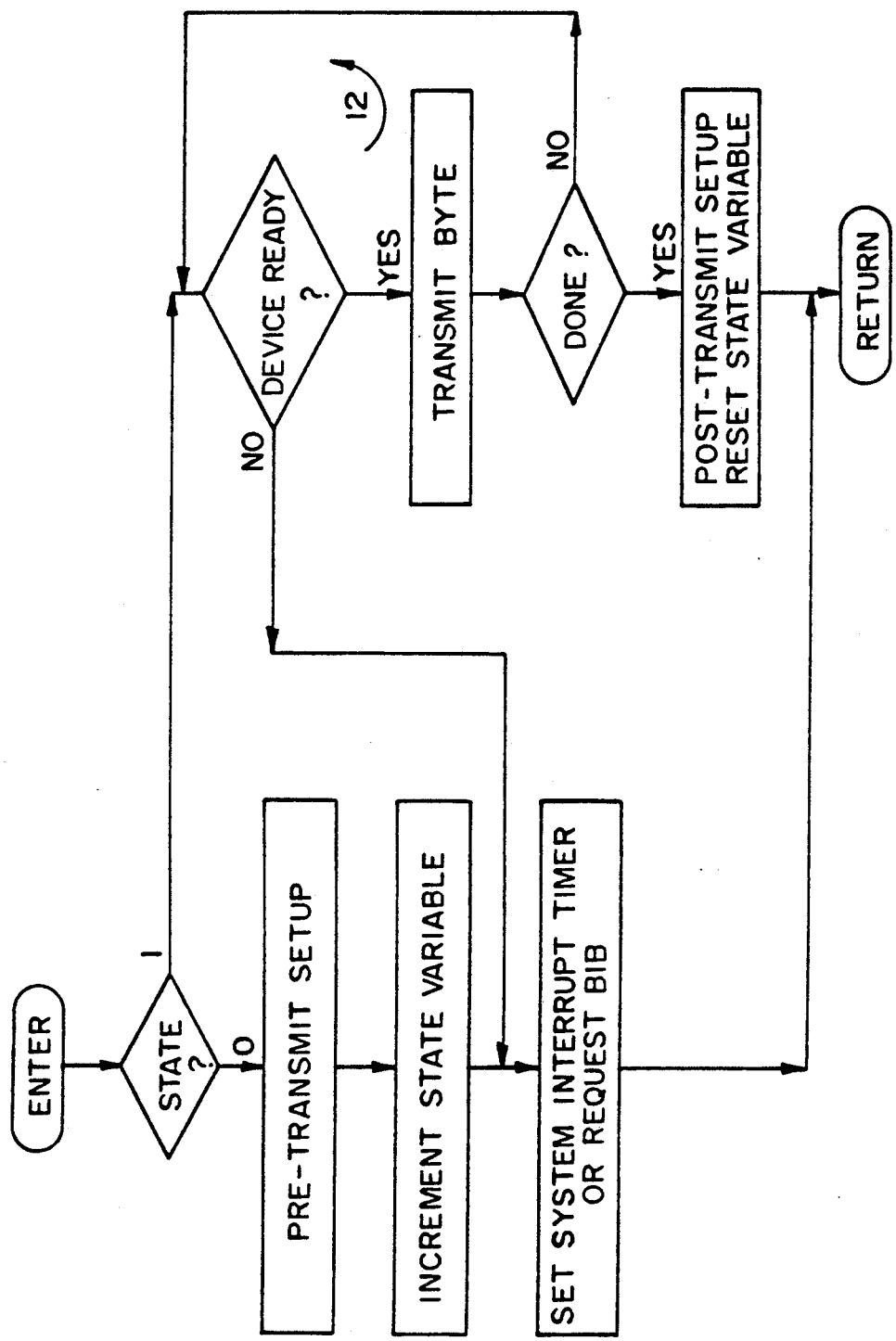
FIG. 2 is a logic flow diagram of the operation of a state controlled device driver with two state operated pursuant to the teachings of the present invention.

Referring to the drawings in detail, FIGS. 1 and 2 demonstrate the differences between a typical prior art device driver for peripheral devices without interrupt generating capabilities as shown in FIG. 1 and the state controlled device driver of the present invention illustrated in FIG. 2.

In a typical prior art device driver as shown in FIG. 1, the operating system, after receiving a request for the service of a peripheral device, relinquishes control to a device driver, after which a pre-transmit setup is executed, and the device readiness to perform its task is then checked. The device driver then stays in loop 10, and waits until the device is ready to perform its task, during the performance of which a transmission of data (bytes) normally takes place. This is repeated until the task is d and a 'done' condition is satisfied, at which time a post-transmit setup is executed, and control is relinquished back to the operating system. In this prior art system, control is relinquished to the device driver, and if the peripheral device is not ready to perform its task, then the operating system must wait until the device becomes ready and performs its task before control is released back to the operating system.

FIG. 2 illustrates a logic flow diagram of the operation of a state controlled device driver with two states operated pursuant to the teachings of the present invention. In the operation of the state controlled device driver of FIG. 2, the operating system relinquishes control to the device driver, after which the state of the device driver, either zero or one, is checked. Initially, the state is set to zero so that a pre-transmit setup routine is executed, and the state variable is then incremented by one. The routine then sets up an auto return scheme by requesting and setting a system interrupt timer resource to an interval which best optimizes the system performance for that particular peripheral device. Control is then returned to the operating system, which can start or continue other tasks. Upon system timer interrupt, the device driver is called again via a corresponding interrupt vector. This time when the state variable is checked, it is a one, which causes a check for the readiness of the device to perform its task. If the device is not ready yet, the driver exits upon setting the system timer again. If the device is ready, then a transmission of data (bytes) normally takes place to enable the device to perform its task, during which the device driver continuously cycles through loop 12 and continuously checks on the readiness of the device to perform the task, after which a 'done' condition (such as a count) is checked. Initially, the 'done' condition will not normally be satisfied, which causes a check for device readiness, and frequently the driver will exit again and return control to the operating system. During these operations, the state variable remains set to one, and the operation is repeated until the 'done' condition is satisfied. When the 'done' condition is satisfied, a post-transmit setup routine is executed, the state variable is reset to zero, and control is returned to the operating system for the last time for that task.

Figure 3:
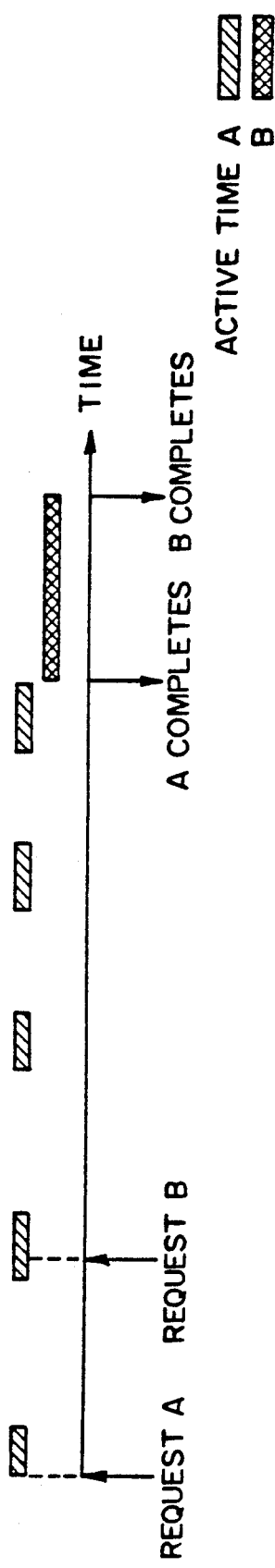
FIGS. 3 and 4 are system performance impact diagrams illustrating the differences in CPU utilization and system wait time between the prior art approach of FIG. 1 and the state controlled device driver of FIG. 2 operated pursuant to the teachings of the present invention.
Figure 4:
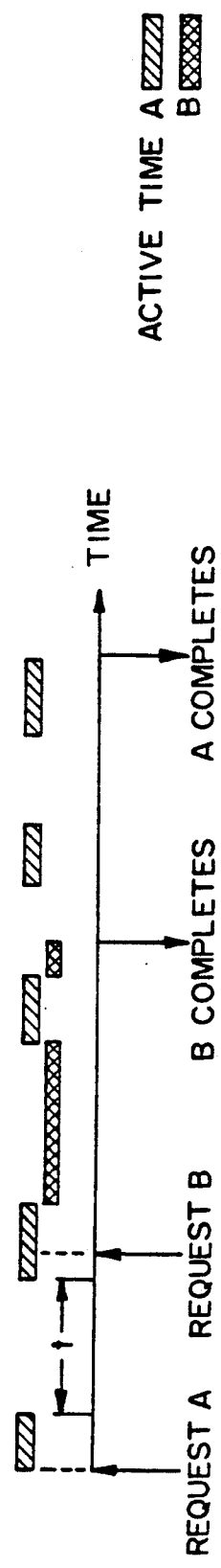

The system performance impact diagrams of FIGS. 3 and 4 illustrate in an exemplary situation the differences in CPU utilization and system wait time between the prior art arrangement and the state controlled device driver of the present invention. The illustrated Active time represents actual setup, transmission or processing time rather than idle time. Task A represents a request for processing a task handled by a peripheral device, while task B corresponds to any other processing task. For example, task A can be a request for a printout, while task B is a request for compilation. Referring to the prior art operation illustrated in FIG. 3, a request for task A causes the operating system to relinquish control to the device driver, which initially proceeds through a pretransmit setup routine and then waits for the peripheral device to become ready to perform its task, and then causes the peripheral device to perform its task intermittently between periods of nonutilized time, during which the device is not ready or able to perform its task for whatever reason.

After control has been relinquished to the device driver, the operating system receives a request for task B, but the operating system must wait during the intermittent completion of task A for its completion, after which the device driver returns control to the operating system, which can then relinquish control to a device driver for task B. In the illustrated example, task B is CPU intensive or the peripheral device for task B is a fast device, and task B is performed continuously to completion.

In the operation of the state controlled device driver of the present invention illustrated in FIG. 4, the requests for tasks A and B are received at the same times as in the previous example. In performing task A, the device driver first checks the state variable, which is initially set to zero, then performs a pre-transmit setup routine, increments the state variable to one, sets the system interrupt timer for return after a time period t, and then returns control to the operating system. After expiration of the time period t, the operating system returns control to the device driver which first checks the state variable, which is now one, and next checks the readiness of the peripheral device to perform its task A. If the peripheral device is ready to perform its task A, the device driver causes the device to perform task A and proceeds through loop 12 until the device is no longer ready to perform its task. The device driver relinquishes control back to the operating system whenever the device is not ready to perform its task, and also sets the interrupt timer to a time period t. Control is again relinquished to the operating system, which in the interim has received a request for task B. The operating system then relinquishes control to the device driver for task B, and in this example, task B has a lower priority than task A or task B has completed its active phase, therefore task A regains the CPU at the elapse of time period t. Task A then partially executes before the device is no longer ready to complete task A. The device driver for task A then relinquishes control back to the operating system, which relinquishes control to the device driver for task B, and in the interim the device has become ready to perform and complete task B, after which the device driver proceeds through the post-transmission setup, resets its state variable to zero, and relinquishes control for the last time to the operating system, which after expiration of the system interrupt timer period, relinquishes control to the device driver for task A, which again completes its task in an intermittent manner until the completion of task A.

It can be seen from a comparison of the two modes of operation of FIGS. 3 and 4, that the state controlled operation of the present invention allows better utilization of the time of the CPU, completing the assigned tasks A and B in less time than in the prior art approach. Moreover, as illustrated by the example of FIG. 4, the state controlled device driver can be used to drive slow devices such as device A in a real time nonmultitasking system which would normally be "hung up" by a slow device such as the device for task A. Typical applications are for tape drives, printers, disk drives, communication busses, and instrument drivers in industrial control systems.

Moreover, embodiments of a state controlled device driver pursuant to the present invention might operate in more than two internal states. For example, in the case of tape drive write, the state controlled device driver states would correspond to: pre-transmit setup and seek; each block (or byte) write; end-of-file write and post-transmit setup. In the exemplary case of an IEEE488 bus communication, the write operation states would correspond to: pre-transmit setup and initial bus command write; data write; terminating bus command write and post-transmit setup.

The state controlled device driver can directly replace an existing driver and improve system performance without an impact on the operating system. Moreover, it supports a modular design concept and localizes all decisions and uniqueness in one state controlled device driver, simplifying the system design and assisting in error isolation.

While several embodiments and variations of the present invention for a state controlled device driver are described in detail herein, it should be apparent that the disclosure and teachings of the present invention will suggest many alternative designs to those skilled in the art.

What is claimed is:

1. In a real time computer system having a system timer and operated by a non-multitasking operating system which controls the operation of polled peripheral devices which do not have an interrupt generation capability, such as printers, disc drives, tape drives, bus controller and polling loops, the improvement comprising each peripheral device having a state controlled device driver associated therewith for driving that peripheral device, said state controlled device driver having a first state in which the peripheral device driver performs a pretransmit setup and increments a state variable, and having at least one additional control state in which the peripheral device driver performs a task until the task is completed or the peripheral device is no longer ready to perform the task, after which the state controlled device driver returns control to the operating system to allow the operating system to perform other function, after setting a system timer interrupt or system request bit to request the operating system to cause return of control to the device driver after the expiration of a time period.

2. A real time computer system as claimed in claim 1, said state controlled device driver utilizing a single entry software routine defining said first state in which the software routine executes a pretransmission setup, increments a state variable, and sets a system interrupt timer or system request bit, and then returns control to the operating system, and defining at least one additional control state in which the software routine causes the peripheral device to perform a task until the task is completed or the peripheral device is no longer ready to perform the task, at which the device is no longer ready to perform the task, at which the device driver sets a system interrupt timer or system request bit and returns control to the operating system to allow the operating system to perform other functions.

3. A method of operating a real time computer system having a system timer and operated by a non-multitasking operating system which controls the operation of polled peripheral devices which do not have an interrupt generation capability, such as printers, disc drives, tape drives, bus controllers and polling loops, comprising utilizing for each peripheral device a state controlled device driver having a first state in which the peripheral device driver performs a pretransmit setup and increments a state variable and having at lest one additional control state in which the peripheral device performs a task until the task is completed or the peripheral device is no longer ready to perform the task, after which the state controlled device driver returns control to the operating system to allow the operating system to perform other functions, after setting a system timer interrupt or system request bit to request the operating system to cause return of control to the device driver after the expiration of a time period.

4. A method of operating a real time computer system as claimed in claim 3, said state controlled device driver utilizing a single entry software routine defining said first state in which the software routine executes a pretransmission setup, increments a state variable, and sets a system interrupt timer or system request bit, and then returns control to the operating system, and defining at least one additional control state in which the software routine causes the peripheral device to perform a task until the task is completed or the peripheral device is no longer ready to perform the task, at which time the device driver sets a system interrupt timer or system request bit and returns control to the operating system to allow the operating system to perform other functions.

* * * * *

UNITED STATES PATENT AND TRADEMARK OFFICE
CERTIFICATE OF CORRECTION

PATENT NO. : 5,081,577
DATED : January 14, 1992
INVENTOR(S) : Richard Hatle It is certified that error appears in the above-identified patent and that said Letters Patent is hereby corrected as shown below:

Column 1, line 41: after "and" delete "as".

Column 2, line 56: "state" should read --states--.

Column 3, line 14: delete "d" and insert --completed--.

Column 5, line 35, Claim 1: "controller" should read as --controllers--.

Column 5, line 47, Claim 1: "function" should read as --functions--.

Column 6, lines 11-12, Claim 2: after "task" delete "at which the device is no longer ready to perform the task".

Column 6, line 25, Claim 3: "lest" should read --least--.

Signed and Sealed this

Eighth Day of June, 1993

Attest:

MICHAEL K. KIRK

*Attesting Officer*     Acting Commissioner of Patents and Trademarks